United States Patent

Ruddle

[11] Patent Number: 5,142,565
[45] Date of Patent: Aug. 25, 1992

[54] CONTROLLER FOR MANAGING DATA COMMUNICATION WITH A HOST COMPUTER FOR THE PURPOSE OF USER VERIFICATION BY VOICE PROCESSING

[76] Inventor: Ian Ruddle, 80 Park Ave., Apt. 19N, New York, N.Y. 10016

[21] Appl. No.: 772,600

[22] Filed: Oct. 8, 1991

Related U.S. Application Data

[63] Continuation of Ser. No. 366,743, Jun. 14, 1989, abandoned.

[51] Int. Cl.$^5$ .................................... H04M 11/00
[52] U.S. Cl. ...................... 379/95; 379/88; 379/93
[58] Field of Search ............ 379/95, 88, 89, 355, 379/199, 93, 55

[56] References Cited

U.S. PATENT DOCUMENTS

| | | | |
|---|---|---|---|
| 4,363,102 | 12/1982 | Holmgren et al. | |
| 4,484,306 | 11/1984 | Kulczyckyj et al. | 379/95 |
| 4,577,067 | 3/1986 | Levy et al. | 379/88 |
| 4,585,904 | 4/1986 | Mincone et al. | 379/95 |
| 4,694,492 | 9/1987 | Wirstrom et al. | 379/95 X |
| 4,707,804 | 11/1987 | Leal | 379/95 |
| 4,737,976 | 4/1988 | Borth et al. | 379/89 |
| 4,763,351 | 8/1988 | Lipscher et al. | 379/95 |
| 4,785,408 | 11/1988 | Britton et al. | 379/88 |
| 4,788,715 | 11/1988 | Lee | 379/88 |
| 4,814,972 | 3/1989 | Winter et al. | 379/95 |
| 4,850,005 | 7/1989 | Hashimoto | 379/199 |
| 4,876,717 | 10/1989 | Barron et al. | 379/95 |
| 4,905,281 | 2/1990 | Surjaatmadja et al. | 379/95 X |

OTHER PUBLICATIONS

Article entitled "Speaker Verification Over Long Distance Telephone Lines," 1989 International Conference on Acoustics, Speech, and Signal Processing, May 23–26, 1989, Glasgow, Scotland (five pages).
International Preliminary Examination Report for PCT application Ser. No. PCT/US90/03302 filed Jun. 11, 1990.

Primary Examiner—James L. Dwyer
Assistant Examiner—Ahmad F. Matar
Attorney, Agent, or Firm—Kilpatrick & Cody

[57] ABSTRACT

A system and method are disclosed for controlling data communication between a host computer and a remote device such as a terminal. The controller suspends data communication between the two devices when desirable to effect verification of information such as a user's voice characteristics obtained over the same (or a different) communication channel.

8 Claims, 6 Drawing Sheets

CONTROLLER FOR MANAGING DATA COMMUNICATION WITH A HOST COMPUTER FOR THE PURPOSE OF USER VERIFICATION BY VOICE PROCESSING

This is a continuation of copending application Ser. No. 07/366,743 filed on Jun. 14, 1989, now abandoned.

This invention relates to a switching system and process for controlling data communication between a host computer and a remote device. The apparatus may be used to suspend data communication, pending verification of a user by matching the user's voice characteristics with a pre-registered file, passed over a standard telephone line.

BACKGROUND OF THE INVENTION

Maintaining the integrity of the information contained in a computer system is of great importance to computer operators. Traditional means of limiting system access to authorized users include requiring those desiring admittance to provide identifying information including a password. This information typically is entered into the data stream between the terminal in use and the host computer and has proven to be extremely useful in distinguishing authorized from unauthorized users. In some cases, additional layers of passwords or challenges have been added. Many systems, however, require even greater security than the conventional methods provide. For these systems information obtained from sources other than the data stream, such as voice intelligence, furnishes an additional measure of protection not present in the traditional approach to computer security.

SUMMARY OF THE INVENTION

The communication controller of the present invention suspends data communication between a host computer and a remote device, such as a terminal, while additional identifying information is obtained from a user. Addressing and switching techniques preclude data communication with the host computer over a particular line at prescribed points in the access sequence, such as when a user is attempting initial entry into the system or accessing a "higher" or more sensitive level of recorded information. While data communication is suspended the telecommunications control unit associated with the particular incoming line remains in or returns to "voice" mode and allows voice transmissions to be made to a conventional voice processing unit. If the voice information falls within acceptable limits a signal is returned to the telecommunications control unit, causing it to switch to data mode and allow continued data communication between the host computer and the terminal. If the voice information lies outside acceptable parameters, a "clear and reset" signal is sent to the telecommunications control unit and communication with the terminal discontinued.

It is therefore an object of the present invention to provide an apparatus for temporarily suspending data communication between a host computer and a terminal.

It is an additional object of the present invention to provide an apparatus for providing an increased measure of integrity for a multi-user computer system by suspending data communication while verification based on information obtained from a different source, such as a user's voice, is performed.

Other objects, features, and advantages of the present invention will become apparent with reference to the remainder of the written portion and the drawings of this invention.

DETAILED DESCRIPTION OF THE DRAWINGS

Figure 1:
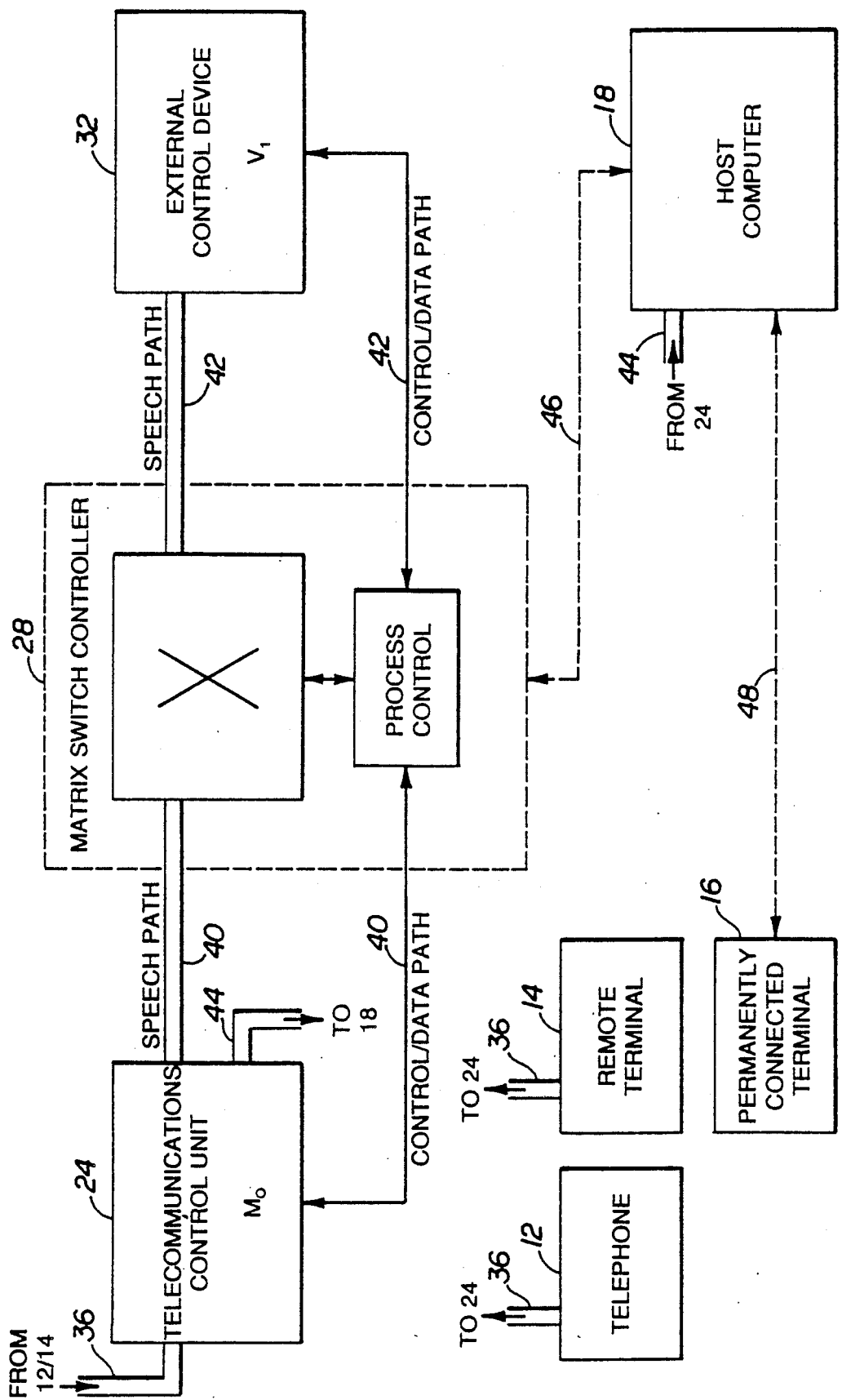
FIG. 1 is a block diagram of the control system of the present invention showing the interaction between the controller, host computer, and alternate terminals.

FIG. 1 details the major components of the control system 10 of the present invention and their interaction with a telephone 12, remote terminal 14 (or permanently connected terminal 16) and host computer 18. Control system 10 includes telecommunications control unit 24, matrix switch controller 28 (including process control software), and external control device 32. Control unit 24, which may be a standard V22 modem modified to pass voice information and generate and respond to additional non-standard commands, serves to transmit and receive data to terminal 14 via standard telephone line 36. Matrix switch controller 28 connects control unit 24 to the external control device 32 via lines 40 and 42 and routes verification information between the two devices. External controller 32 interrogates the user of terminal 14 in voice mode and compares the audible response received over telephone line 36 to a preselected file containing voice information for a particular user identification symbol. Line 44, typically an RS 232 connector cord, links control unit 24 to host computer 18 to allow data communications between the two apparatuses. Standard telephone-type connectors 48 (such as RJ11 connectors) and adaptors may be used to permit passage of both voice information and data to and from the ports of control unit 24.

Although only one each control unit 24, matrix switch controller 28, and external controller 32 are specifically shown in FIG. 1, those skilled in the art will readily recognize that any number of such devices may be used in the controller system of the present invention, depending upon the size of the computer network and the number of verification requests anticipated. In most cases more than one of these devices will be present in the system, and intercommunication is conducted using a standard common UNIX bus with each matrix switch controller 28, which as contemplated will manage as many as sixteen control units 24 and four paths 40 and 42 to external controllers 32, merely scanning or polling the devices sequentially to determine when action is needed.

The matrix switch controller 28 also may be connected in a controlled link path 46 to the associated host computer 18 when the configuration is used to verify a user on a permanently connected terminal 16, such as an SNA network, or a multiplexed communications link 48. In accordance with this configuration, telecommunications control unit 24 may be modified to detect at the appropriate time DTMF keyed information from the keypad of telephone 12 representing the user identifier for "voice" file selection and to ensure the correct data session on the permanent network is verified.

Figure 2:
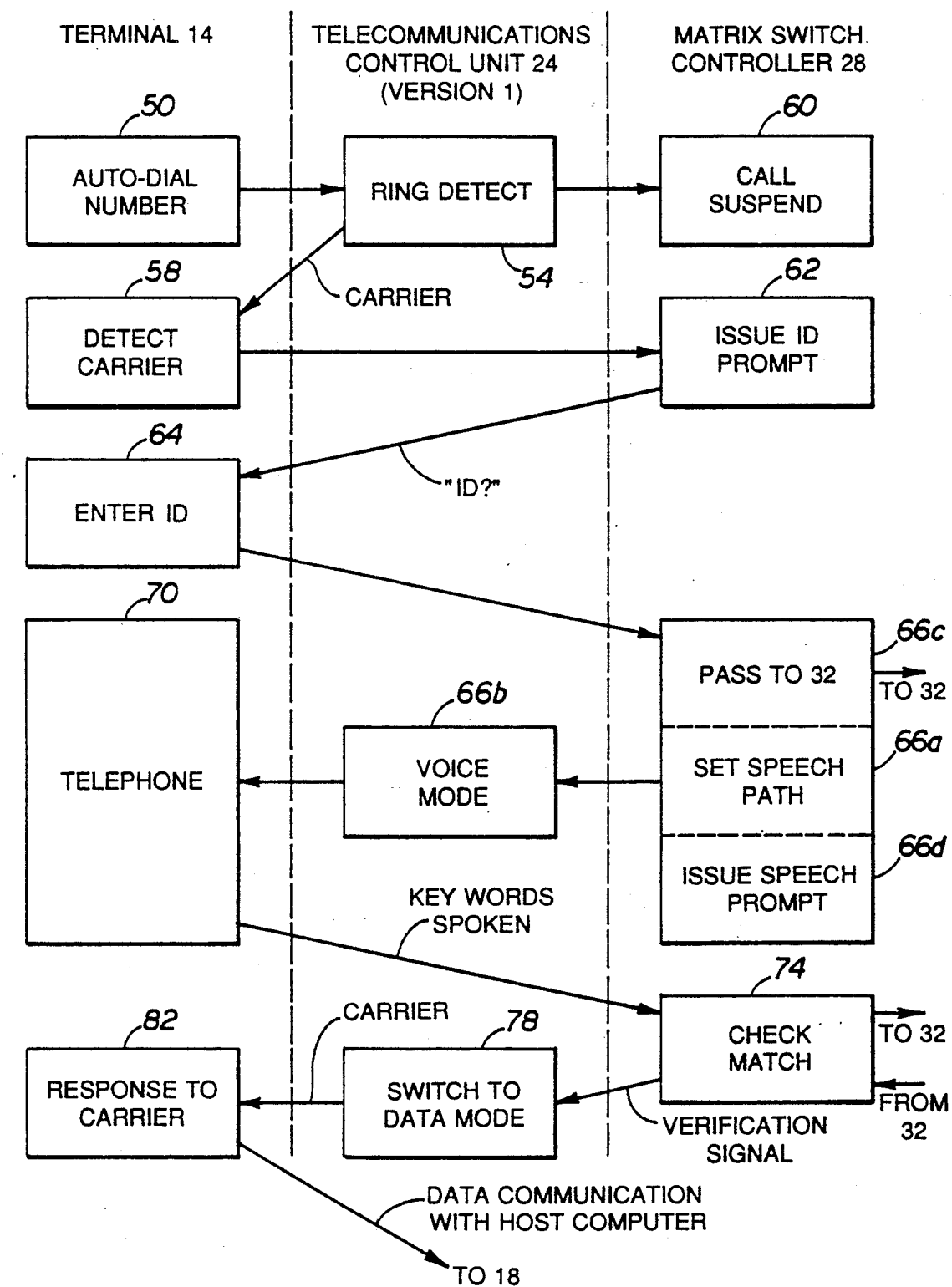
FIG. 2 is a flow chart of the method of suspending and reestablishing data communication between the terminal and host computer for purposes of user identification performed by the controllers in FIG. 1 for the basic requirement of a remote terminal user.
Figure 3:
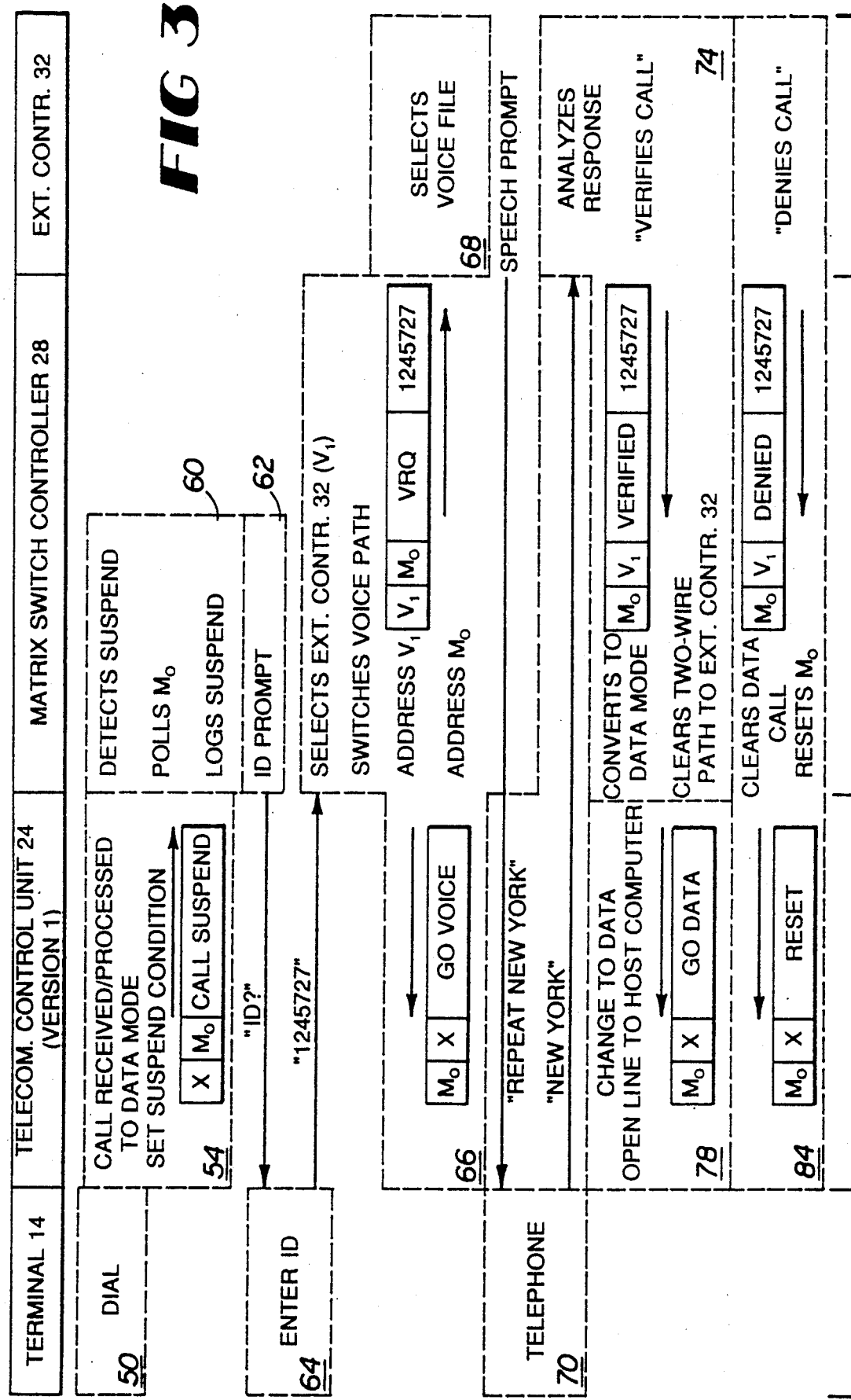
FIG. 3 is a flow chart detailing the commands issued by the controller of FIG. 1 while performing the method of FIG. 2.

FIGS. 2 and 3 present flow charts of the process performed and commands issued by the controllers of the present invention to serve the remote or dial-up users from the terminal 14. When the ring current generated by an incoming call is detected via telephone line 36 (block 50), control unit 24 (labeled "Version 1" in FIGS. 2-3 and 6) is placed in "ring detect" mode and generates a carrier signal (block 54) similar to that initiated by any standard V22 modem. Appropriate equipment attached to terminal 14 detects the carrier (block 58) and immediately is placed in "data" mode ready to transmit data to the host computer 18.

Control unit 24 also sends a "suspend" signal to matrix switch controller 28, which logs the port number of the unit 24 and the "call suspended" condition and responds by prompting the user of terminal 14 to enter identifying information (such as a password or user identification number or name) into the data stream between the terminal and control unit 24 (block 62). In conjunction with the process control software, matrix switch controller 28 passes such information to external controller 32. Matrix switch controller 28 also notes the identity of the control unit 24 and external controller 32, switches the two-wire voice path 40 and 42 between the appropriate units (block 66a), commands control unit 24 to enter "voice" mode (block 66b), and through a "verification request" signal provides to external controller 32 the identification information obtained from both the remote user and the control unit 24 (block 66c). Of course, data communications may be suspended at any desired time, including when particular triggering data is transmitted to or received from terminal 14.

Once the verification request signal is received by the external controller 32, that device selects the pre-registered user "voice" file corresponding to the identification number provided (block 68 of FIG. 3) and the user is prompted (block 66d) to recite appropriate words or phrases into the telephone equipment using line 36 (block 70). External controller 32 subsequently compares the information obtained through the voice link to the voice characteristics prerecorded in the user "voice" file and either renders a verification decision (positive or negative) or continues the recitation prompts (block 74). When a decision is made external controller 32 sends an appropriate signal to matrix switch controller 28. If voice verification is achieved (or a pre-set time has elapsed) control unit 24 in turn is instructed to return to "data" mode (block 78) and allow data communication between terminal 14 and host computer 18 (block 82) and lines 40 and 42 are cleared. Conversely, if a voice match is not made, control unit 24 is instructed to enter a "clear and reset" mode (block 84 of FIG. 3) whereby the unverified call is cleared from the system and the control unit reset to an "on-hook" condition for receiving other incoming calls.

Figure 4:
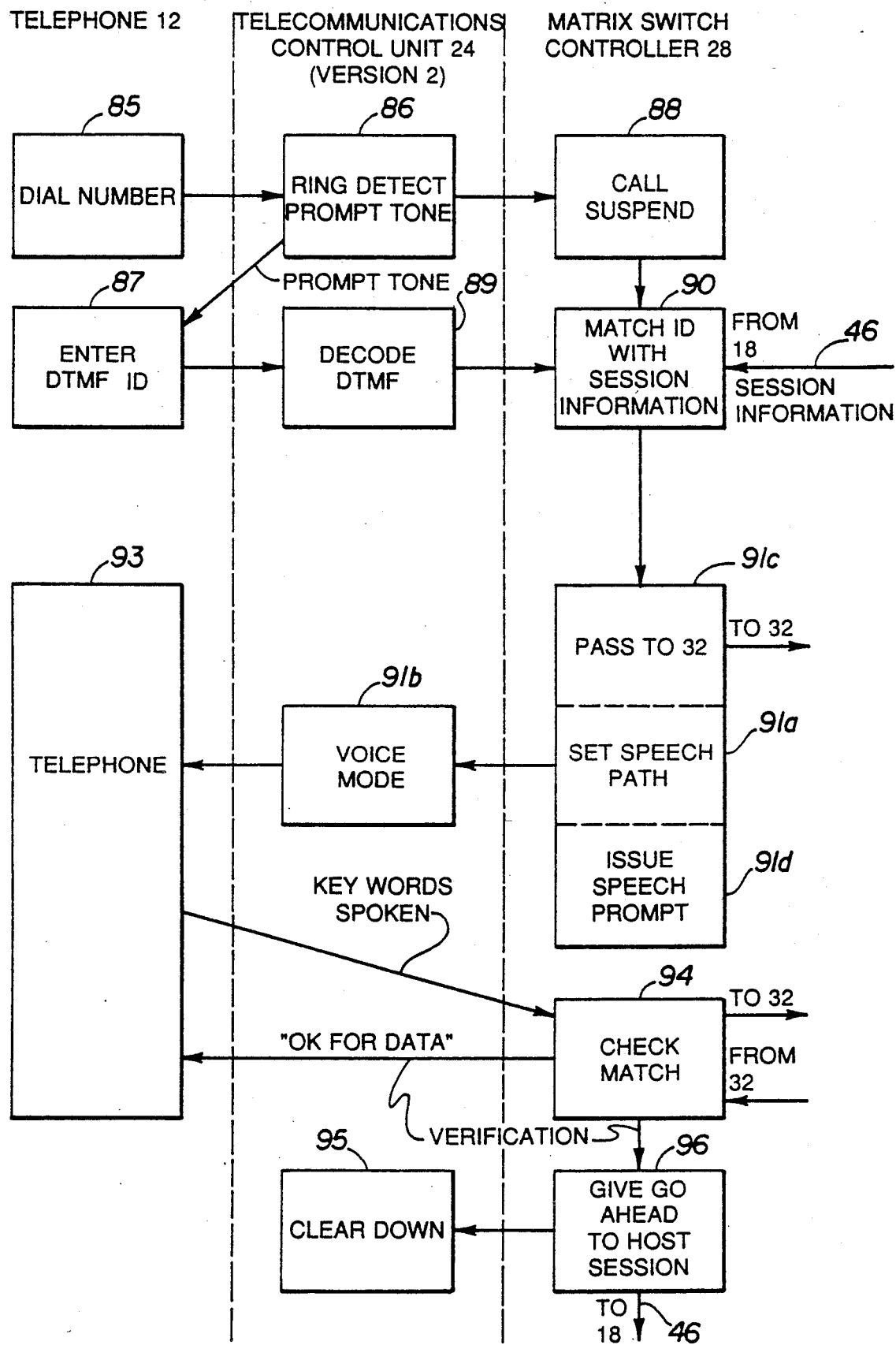
FIG. 4 is a flow chart of the method of suspending and reestablishing data communication between the terminal and host computer for purposes of user identification performed by the controllers in FIG. 1 when a permanently connected terminal is used.
Figure 5:
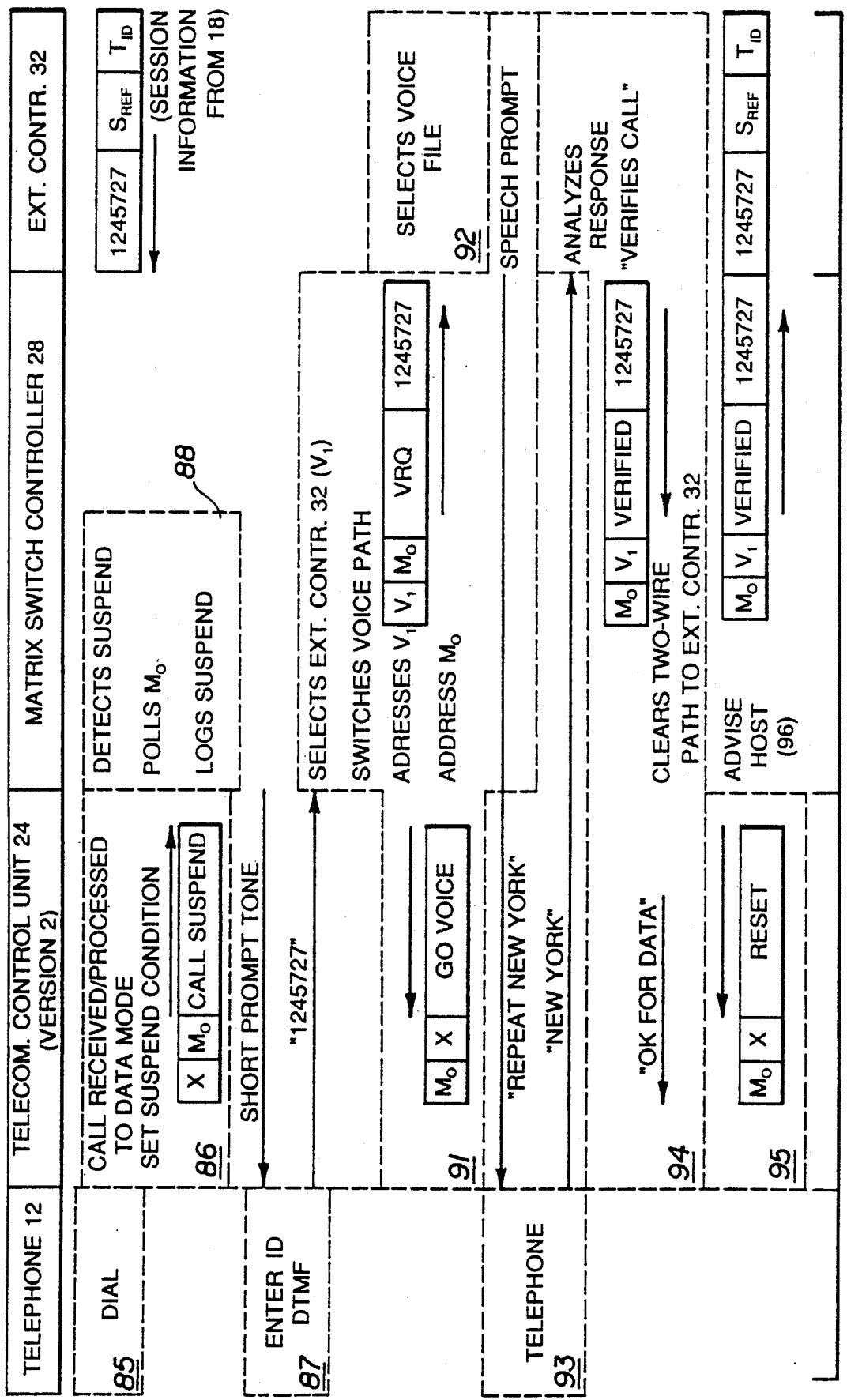
FIG. 5 is a flow chart detailing the commands issued by the controller of FIG. 1 while performing the method of FIG. 4.

FIGS. 4 and 5 detail the process performed and commands issued by the controller of the present invention serving a permanently connected terminal 16. In this embodiment control unit 24 (labeled "Version 2" in FIGS. 4-6) is modified to handle DTMF tones instead of using an analog-to-digital (A/D) converter and is bypassed by the data path, which is routed directly from terminal 16 to host computer 18. When the host 18 determines during the session log-on that user verification is required it will suspend the session and prompt the user to contact the control unit 24 through telephone 12 (block 85). Additionally, the host computer 18 will signal the matrix switch controller 28 over the host control path 46 that a specific session with a particular user requires attention. When the ring current generated by the incoming call is detected, control unit 24 is placed in "ring detect mode" and generates a short prompt tone (block 86) heard by the user. At this time the user enters the identifying information using the keypad of telephone 12 (block 87). Control unit 24 also sends a "suspend" signal to matrix switch controller 28, which logs the port number of the unit 24 (block 88). The matrix switch controller 28 matches the incoming host session information and the decoded DTMF identifier (blocks 89 and 90) and advises the external control device 32 to proceed with interrogation of the user. Matrix switch controller 28 also notes the identity of the control unit 24 and external controller 32, switches the two-wire voice path 40 and 42 between the appropriate units (block 91a), commands control unit 24 to enter "voice" mode (block 91b), and through a "verification request" signal provides to external controller 32 the identification information obtained from both the remote user and the control unit 24 (block 91c). As noted above, data communications may be suspended at any desired time, including when particular triggering data is transmitted to or received from terminal 16.

As in FIG. 2, once the verification request signal is received by the external controller 32, that device selects the pre-registered user "voice" file corresponding to the identification number provided (block 92 of FIG. 5) and the user is prompted (block 91d) to recite appropriate words or phrases into the telephone equipment using line 36 (block 93). External controller 32 subsequently compares the information obtained through the voice link to the voice characteristics prerecorded in the user "voice" file and either renders a verification decision (positive or negative) or continues the recitation prompts (block 94). When a decision is made external controller 32 sends an appropriate signal to matrix switch controller 28. If voice verification is achieved (or a pre-set time has elapsed) control unit 24 in turn is instructed to clear down the call on line 36 and the temporary paths 40 and 42 (block 95). Similarly, a controlled response is sent by the matrix switch controller 28 over the host control path 46 to the host/network computer 18 advising it of the approval to continue the specific session (block 96). Should verification not be granted the host computer 18 will be instructed to cancel the specific session and all paths in the matrix switch controller 28 and telecommunications control unit 24 will be reset.

Figure 6A:
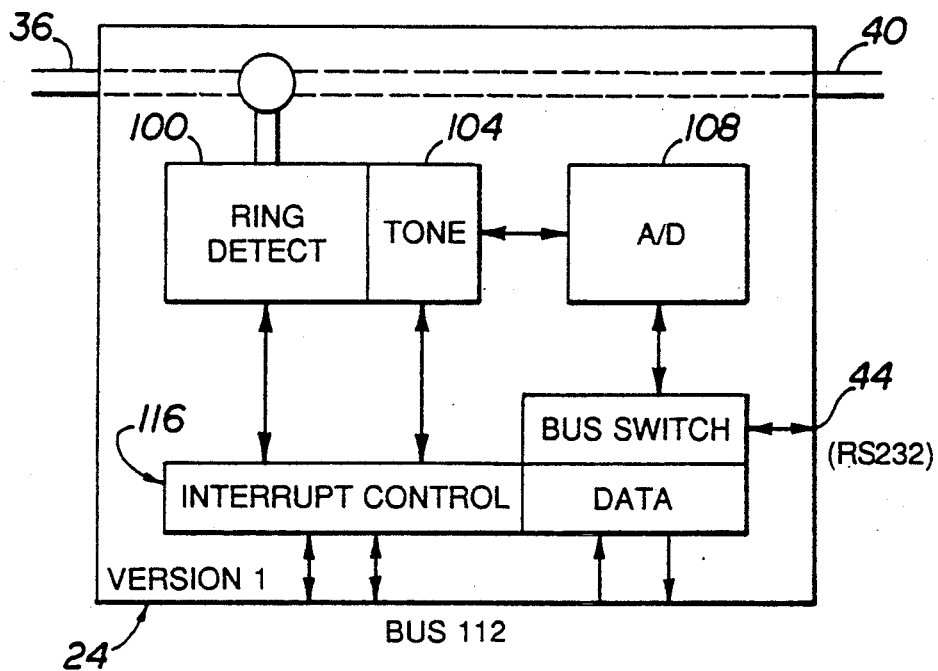
FIG. 6A-B is a block diagram of the two versions of the telecommunications control unit shown in FIG. 1 needed to perform the methods of FIGS. 2 and 4.
Figure 6B:
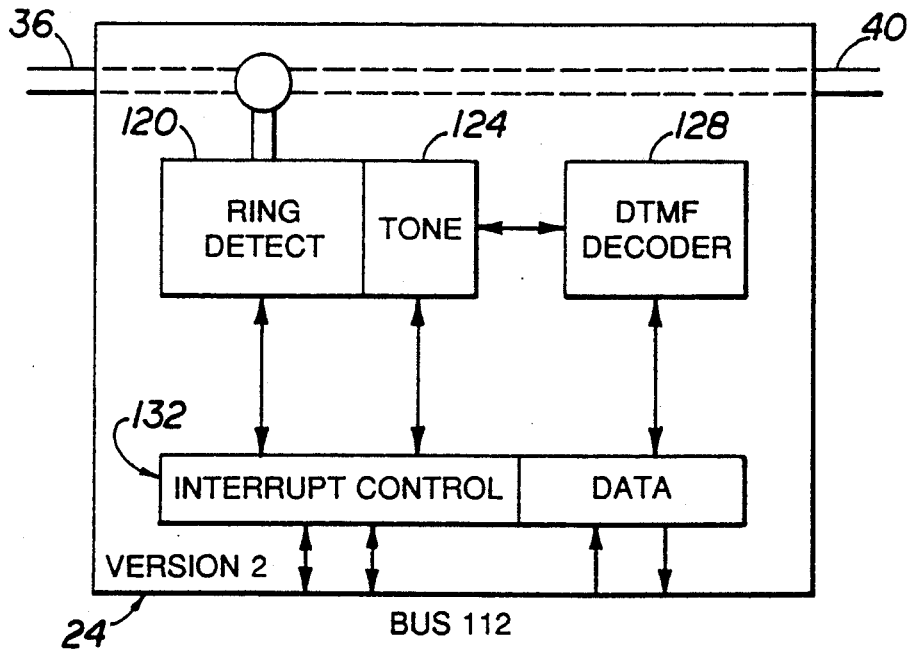

FIG. 6 details the two versions of telecommunications control unit 24 necessary to accomplish the methods described above. Version 1 of control unit 24, used to serve remote terminals, may be a modified V22 modem capable of detecting incoming ring current (block 100), handling tones (block 104), converting the analog tones to digital information (block 108), and communicating with the host computer 18 and via bus 112 (block 116). Version 2 of control unit 24, used in conjunction with a permanently connected terminal or network, may be an intelligent DTMF decoder capable of detecting incoming ring current (block 120), handling tones (block 124), decoding DTMF information (block 128), and communicating via the bus 112 (block 132).

A summary of commands generated by the devices comprising the multi-port control system of FIG. 1 appears below. Such commands may easily be coded in UNIX or other appropriate operating systems, as is well known to those of ordinary skill in this art, and include:

"Call suspended" command—generated after detection of incoming ring current information and includes the default target address of the matrix switch controller 28, the port number of the initiating control unit 24, and the appropriate interrupt address for this command;

"Go voice" command—generated after the process control software has detected receipt of user identification information and includes the port number of the initiating control unit 24 and the appropriate interrupt address for this command;

"Verification request" command—generated after the two-wire voice path 40 and 42 is switched between the initiating control unit 24 and external controller 32 and includes the target address of the external controller chosen, the port number of the initiating control unit, the appropriate interrupt address for this command, and the user's identification information;

"Go data" command—generated after detection of positive verification signal from external controller 32 and includes the port numbers of the initiating control unit 24 and appropriate external controller and the appropriate interrupt address for this command;

"Call verified" and "call denied" commands—generated to the bus after analysis of the identification information and include the port numbers of the external controller 32 and initiating control unit 24 and the appropriate interrupt address for the commands; and "Go session" command—generated after detection of positive verification signal from external controller 32 and includes all port numbers of initiating control unit 24, host session reference number, terminal identification, user DTMF identification, and the appropriate interrupt address for the command.

The invention specifically contemplates that additional commands may be utilized in conjunction with the multi-port system described above. For example, a "busy out" command could be used to disable a specifically addressed telecommunications control unit 24 for maintenance or repair, while a "status check" command could be used to determine the resident state of a particular control unit at a given time. The "call verified" and "call denied" signals issued by external controller 32 likewise could be used for troubleshooting purposes, to cause a specific control unit 24 to be placed in "data" or "clear and reset" modes, respectively. Utilization of the UNIX bus architecture addressing mentioned above also would allow forcible termination of an incoming call at any time and collection of data regarding date, time, control unit address, verification status, etc., if such is desired. Host control path 46 would serve as the preferred conduit for transmitting such management information to the host computer 18.

Additionally, telecommunications control unit 24 (Version 2 of FIG. 6) could be used in a similar system to verify a voice user for accessing a voice host, i.e., a host which prompts the user verbally and reacts to either voice or DTMF tone information.

The foregoing is provided for purposes of illustration, explanation, and description of preferred embodiments of the invention. Modifications and adaptations to these embodiments will be apparent to those of ordinary skill in the art and they may be made without departing from the scope or spirit of the invention.

What is claimed is:

1. A method for verifying the identity of a user connected to a host computer from a remote data terminal via a telephone line, comprising the steps of:
   a. detecting in a selected one of a set of telecommunications control units a host computer use request transmitted by the user from the remote data terminal via the telephone line;
   b. issuing a signal, from the selected telecommunications control unit to a matrix switch controller capable of interpreting the data stream, (1) at least temporarily precluding data communication between the host computer and the user via the remote data terminal without disconnecting the connection with the host computer and (2) providing information unique to the selected telecommunications control unit;
   c. prompting the user to provide identification information for use in verifying the user's identity;
   d. passing the identification information and information unique to the selected telecommunications control unit to a selected external control device;
   e. prompting the user to speak into transmitting equipment communicating with the selected telecommunications unit via the telephone line;
   f. comparing the user's speech to pre-recorded information contained in a file corresponding to the identification information previously provided in order to verity the user's identity; and
   g. if the user's identity is verified, issuing a signal from the matrix switch controller to the selected telecommunications control unit permitting data communication between the host computer and the user via the remote data terminal.

2. A method, utilizing a matrix switch controller connected to a host computer, for verifying the identity of a user logging on to the host computer from a permanently connected terminal, after the host computer has signalled the matrix switch controller that identification verification is desired, comprising the steps of:
   a. detecting, in a selected one of a set of telecommunications control units, a host computer use request transmitted by the user via a telephone line;

b. generating a signal from the selected telecommunications control unit for receipt by the user via the telephone line;

c. receiving the signal by the user, thereby prompting the user to transmit, via the telephone line, encoded identification information for receipt and decoding by the selected telecommunications control unit;

d. issuing a signal, from the selected telecommunications control unit to the matrix switch controller, (1) at least temporarily precluding data communication between the host computer and the permanently connected terminal without disconnecting the connection therebetween and (2) providing information unique to the selected telecommunications control unit;

e. (1) decoding, in the selected telecommunications control unit, the identification information, (2) passing the decoded identification information to the matrix switch controller, (3) matching, in the matrix switch controller, the decoded information with information obtained from the host computer, and (4) instituting communication between the matrix switch controller and a selected external control device;

f. (1) recording, in the matrix switch controller, information unique to the selected external control device, (2) matching that information to the recorded unique information concerning the selected telecommunications control unit, and (3) creating a communications path between the two selected devices for receiving verification information;

g. selecting a pre-registered file corresponding to the decoded identification information;

h. prompting the user to transmit the verification information via the telephone line;

i. comparing, in the selected external control device, the verification information to the pre-registered file;

j. issuing a verification signal, from the selected external control device to the matrix switch controller, indicating whether the user's identity is verified; and k. if the user's identity is verified, issuing a signal from the matrix switch controller to the selected telecommunications control unit permitting data communication between the host computer and the permanently connected terminal.

3. A method for verifying the identity of a user connected to a host computer from a remote data terminal via a telephone line, comprising the steps of:

a. detecting in a selected one of a set of telecommunications control units a host computer use request transmitted by the user from the remote data terminal via the telephone line;

b. issuing a signal, from the selected telecommunications control unit to a matrix switch controller capable of interpreting a data stream, (1) at least temporarily precluding data communication between the host computer and the user via the remote data terminal without disconnecting the connection with the host computer and (2) providing information unique to the selected telecommunications control unit;

c. prompting the user to provide identification information for use in verifying the user's identity;

d. prompting the user to speak into transmitting equipment communicating with the selected telecommunications unit via the telephone line;

e. comparing the user's speech to prerecorded material contained in a file corresponding to the identification information previously provided in order to verify the user's identity; and f. if the user's identity is verified, issuing a signal from the matrix switch controller to the selected telecommunications control unit permitting data communication between the host computer and the user via the remote data terminal.

4. A method for verifying the identity of a user connected to a host computer from a remote data terminal via a telephone line, comprising the steps of:

a. detecting in a selected one of a set of telecommunications control units a host computer use request transmitted by the user from the remote data terminal via the telephone line;

b. issuing a signal at least temporarily precluding data communication between the host computer and the user via the remote data terminal without disconnecting the connection with the host computer;

c. prompting the user to provide identification information for use in verifying the user's identity;

d. prompting the user to speak into transmitting equipment communicating with the selected telecommunications unit via the telephone line;

e. comparing the user's speech to prerecorded material contained in a file corresponding to the identification information previously provided in order to verify the user's identity; and f. if the user's identity is verified, issuing a signal permitting data communication between the host computer and the user via the remote data terminal.

5. An apparatus for verifying the identity of a user (1) connected to a host computer from a data terminal via a telephone line and (2) having access to telephone transmitting equipment for transmitting identification and verification information, comprising:

a. a plurality of telecommunications control units, any selected one of which is uniquely identifiable and adapted to:
   i. detect a host computer use request transmitted by the user from the data terminal;
   ii. issue a signal (1) at least temporarily precluding data communication between the host computer and the user via the data terminal without disconnecting the connection with the host computer and (2) providing information unique to it; and
   iii. receive and re-transmit the identification information;

b. a matrix switch controller, electrically connected to a selected telecommunications control unit and capable of interpreting a data stream, adapted to:
   i. receive the signal from the selected telecommunications control unit;
   ii. receive the identification information retransmitted by the selected telecommunications control unit;
   iii. match the identification information with information obtained from a pre-registered file; and
   iv. issue a signal to the selected telecommunications control unit permitting data communication between the host computer and the user via the data terminal when the user's identity is verified; and c. a plurality of external control devices, any selected one of which is electrically connectable to the telecommunications control unit via the matrix switch controller and to the pre-registered file and adapted to:
  i. receive the information unique to the selected telecommunications control unit;
  ii. compare the verification information with the pre-registered file; and
  iii. issue a verification signal to the matrix switch controller indicating whether the user's identity is verified.

6. An apparatus according to claim 5 in which each telecommunications control unit comprises a bus-controlled modem.

7. An apparatus for verifying the identity of a user (1) of a data terminal permanently connected to a host computer via a network and (2) having access to telephone transmitting equipment for transmitting identification and verification information, comprising:
a. a plurality of telecommunications control units, any selected one of which is uniquely identifiable and adapted to:
  i. detect a host computer use request transmitted by the user from the data terminal;
  ii. issue a signal (1) at least temporarily precluding data communications between the host computer and the user via the data terminal and (2) providing information unique to itself; and
  iii. receive and re-transmit the identification information;
b. a matrix switch controller, electrically connected to a selected telecommunications control unit and capable of interpreting a data stream, adapted to:
  i. receive the signal from the selected telecommunications control unit;
  ii. receive the identification information re-transmitted by the selected telecommunications control unit;
  iii. match the identification information with information obtained from a pre-registered file; and
  iv. issue a signal to the selected telecommunications control unit permitting data communication between the host computer and the user via the data terminal when the user's identity is verified; and
c. a plurality of external control devices, any selected one is electrically connectable to the telecommunications control unit via the matrix switch controller and to the pre-registered file and adapted to:
  i. receive the information unique to the selected telecommunications control unit;
  ii. compare the verification information with the pre-registered file; and
  iii. issue a verification signal to the matrix switch controller indicating whether the user's identity is verified.

8. An apparatus according to claim 7 in which the identification information is transmitted through the telephone transmitting equipment as DTMF tones.

* * * * *